(12) United States Patent  
Tasaka et al.

(10) Patent No.: US 7,463,327 B2  
(45) Date of Patent: Dec. 9, 2008

(54) LIQUID CRYSTAL DISPLAY

(75) Inventors: Yasutoshi Tasaka, Kanagawa (JP);  
Hidefumi Yoshida, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 11/332,491

(22) Filed: Jan. 17, 2006

(65) Prior Publication Data

US 2006/0227266 A1 Oct. 12, 2006

(30) Foreign Application Priority Data

Jan. 19, 2005 (JP) ............................. 2005-011522

(51) Int. Cl.  
*G02F 1/1339* (2006.01)  
*G02F 1/1335* (2006.01)

(52) U.S. Cl. ...................... 349/155; 349/113; 349/114

(58) Field of Classification Search ................ 349/113, 349/114, 155, 157  
See application file for complete search history.

(56) References Cited

U.S. PATENT DOCUMENTS 6,262,783 B1 * 7/2001 Tsuda et al. .................. 349/39  
2001/0026347 A1 10/2001 Sawasaki et al.  
2004/0189928 A1 * 9/2004 Yang et al. ................. 349/155  
2005/0237459 A1 * 10/2005 Ikeda et al. ................. 349/123

FOREIGN PATENT DOCUMENTS

| JP | 2000-267121 A | 9/2000 |
| JP | 2003-241185 A | 8/2003 |
| JP | 2005-173037 | 6/2005 |
| KR | 2001-0083106 A | 8/2001 |

* cited by examiner

*Primary Examiner*—Michael H Caley  
(74) *Attorney, Agent, or Firm*—Nixon & Vanderhye P.C.

(57) ABSTRACT

The invention relates to a reflective or transflective liquid crystal display having alignment regulating structures and provides a liquid crystal display capable of achieving high display quality on which no display irregularity attributable to an irregularity of the cell thickness is visually perceived. A liquid crystal display includes first and second substrates, a liquid crystal layer sealed between the substrates, a pixel region formed on the first substrate and including a reflective area having a reflective plate for reflecting light impinging thereon from the side of the second substrate, a TFT formed on the first substrate and having source and drain electrodes formed from the same material as the reflective plate, a protective film formed on the TFT, a columnar spacer formed in a region where a gate bus line, a drain bus line, and the protective film are provided one over another, the columnar spacer contacting both of the substrates to maintain a cell gap, and a protrusive structure formed in the reflective area on the second substrate from the same material as the columnar spacer for regulating the alignment of liquid crystal molecules.

15 Claims, 8 Drawing Sheets

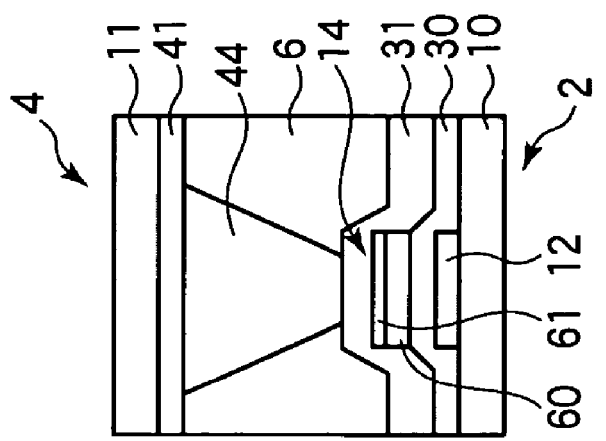
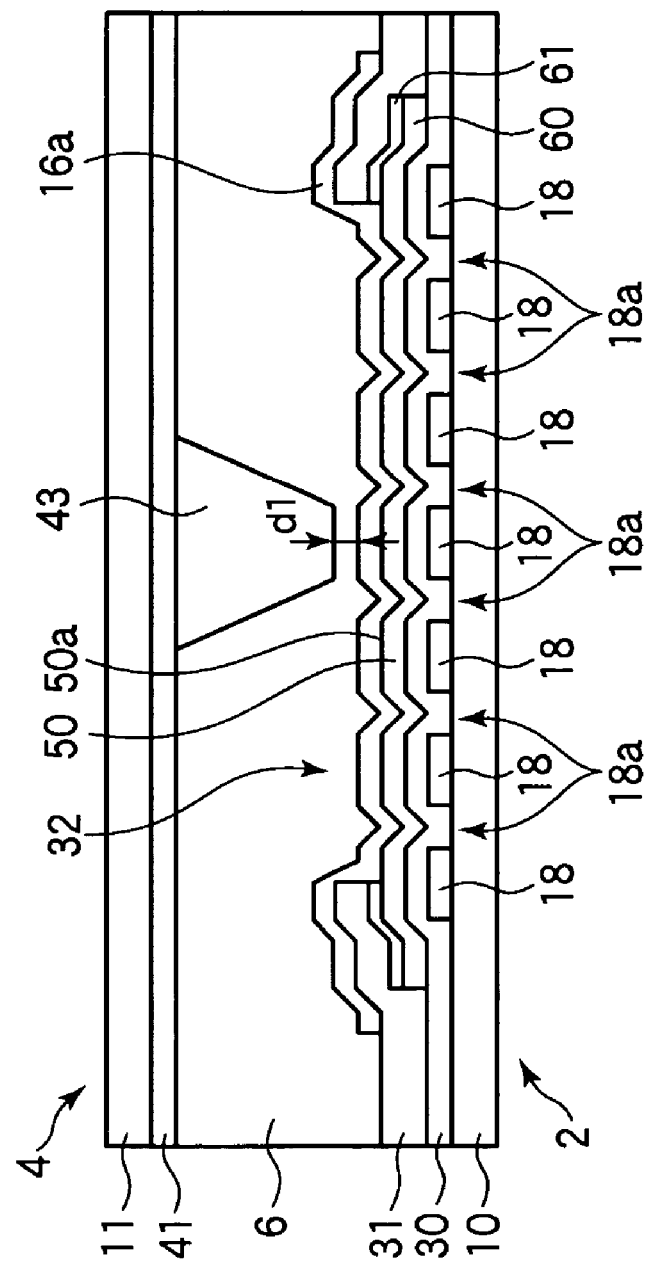

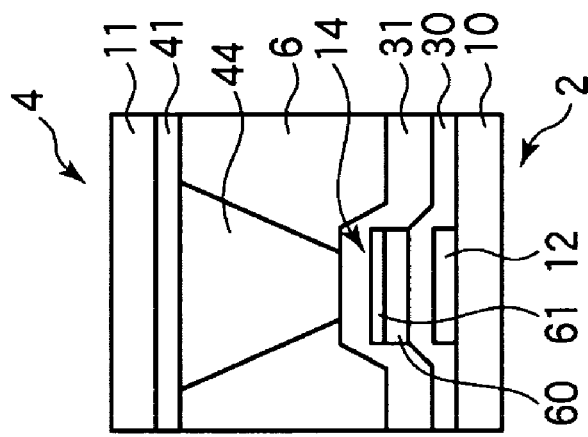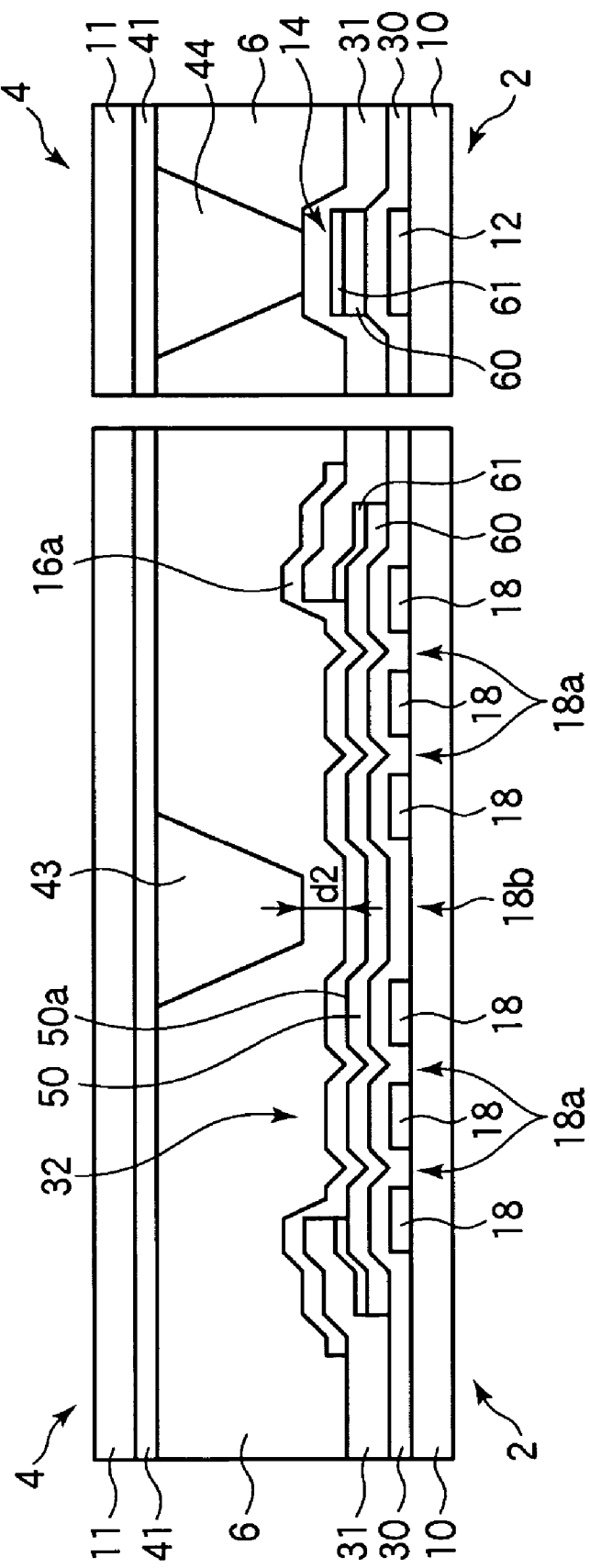

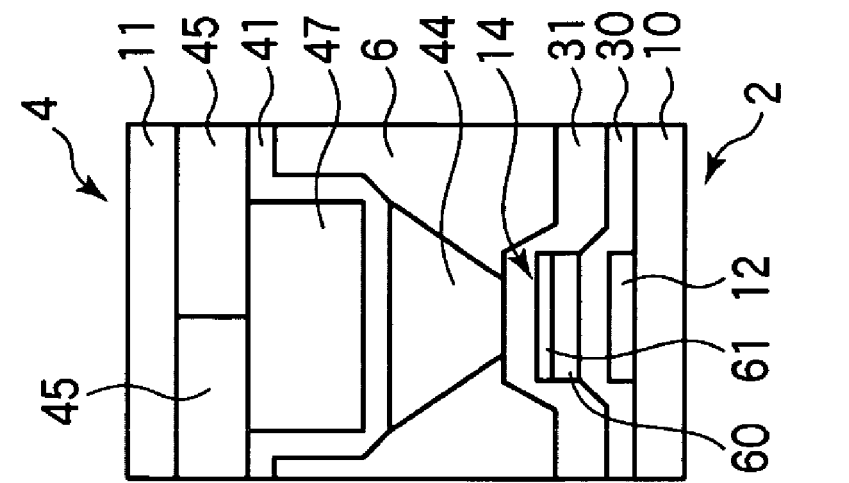
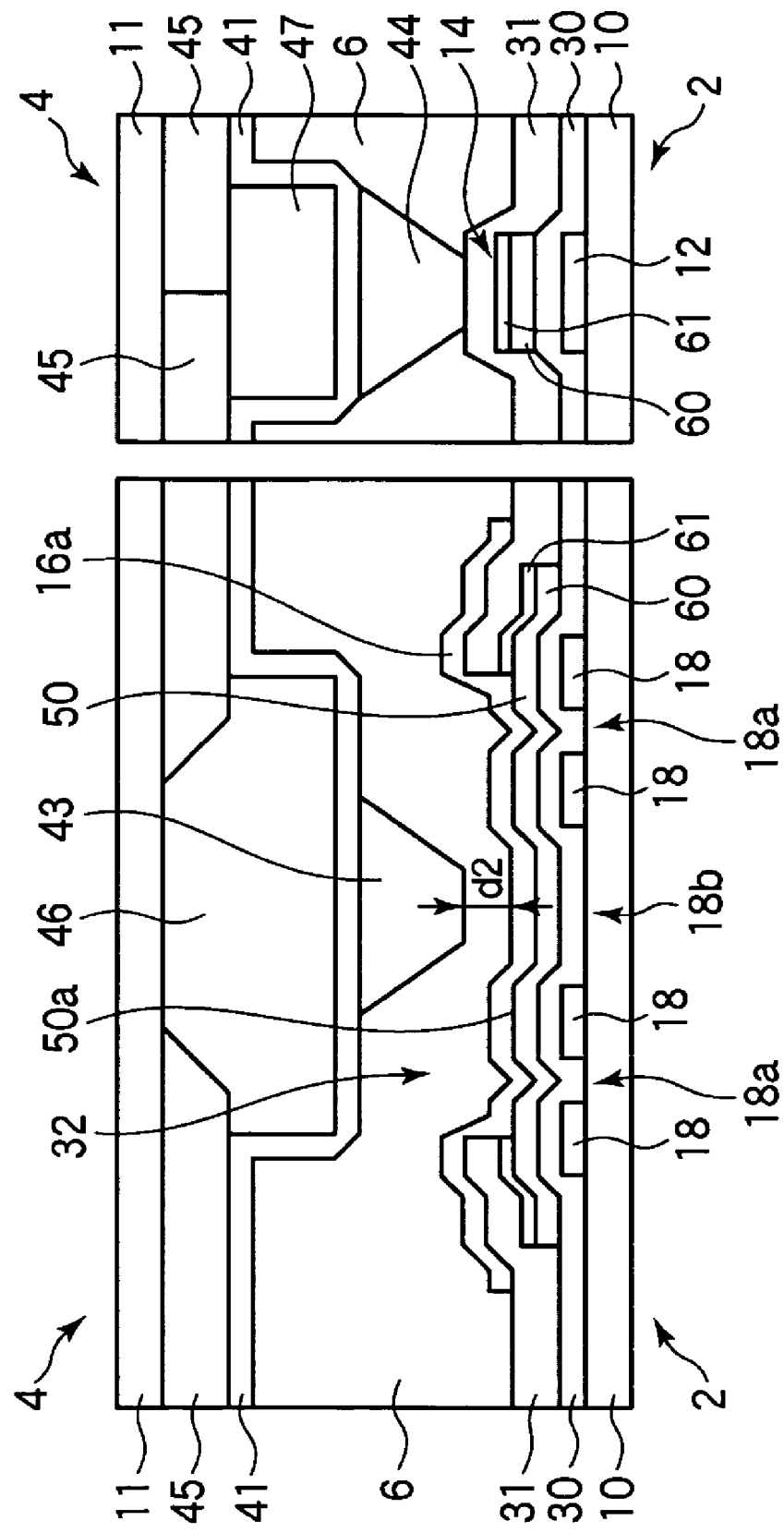

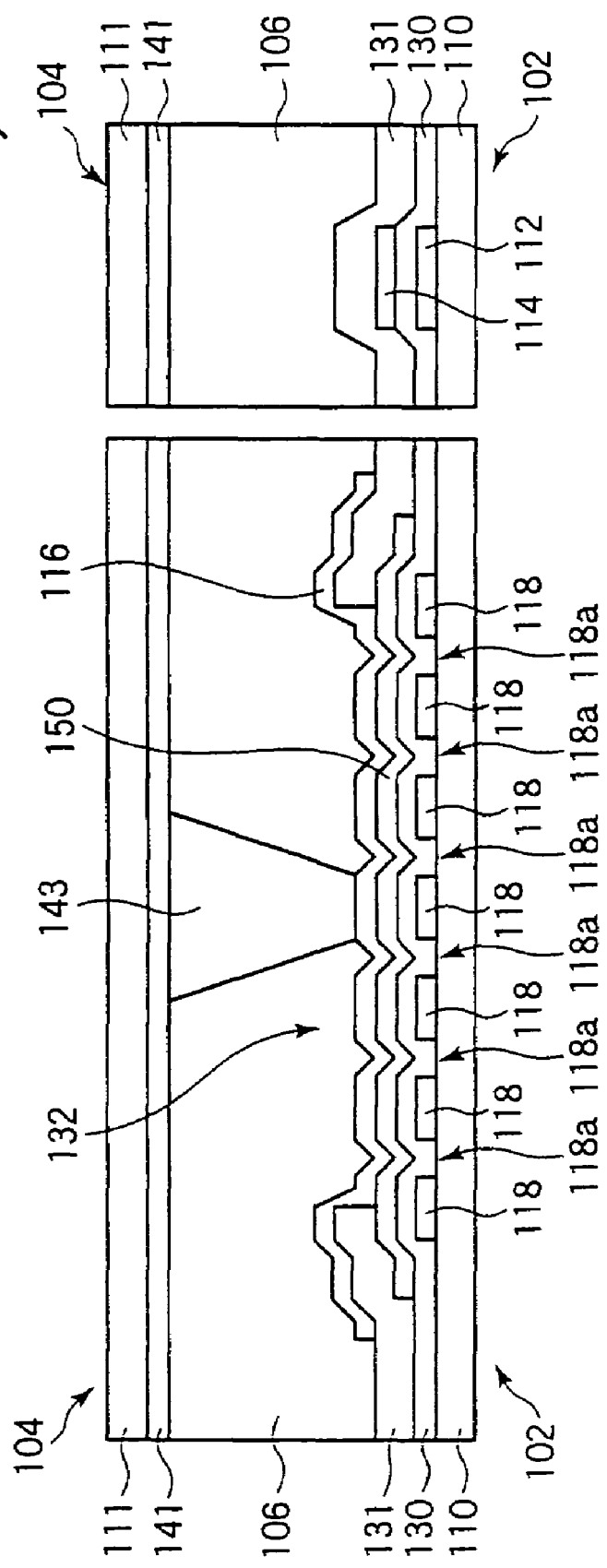

LIQUID CRYSTAL DISPLAY

BACKGROUND OF THE INVENTION

1. Field of the Invention

The present invention relates to a liquid crystal display and, more particularly, to a reflective or semi-transmissive liquid crystal display having alignment regulating structures for regulating the alignment of the liquid crystal.

2. Description of the Related Art

Recently, active matrix liquid crystal displays having a thin film transistor (TFT) at each pixel are widely used as displays in all kinds of applications. Under such a circumstance, semi-transmissive (transflective) liquid crystal displays capable of displaying in both of reflective and transmissive modes have come in use as displays for mobile terminals or notebook PCs.

FIG. 7 shows a configuration of one pixel of a semi-transmissive liquid crystal display panel utilizing a technique proposed in a Japanese patent application (Application No. 2003-410742) made by the applicant. FIG. 8A is a view of a sectional configuration of the liquid crystal display panel taken along the line X-X in FIG. 7, and FIG. 8B is a view of a sectional configuration of the liquid crystal display panel taken along the line Y-Y in FIG. 7. As shown in FIGS. 7 to 8B, the liquid crystal display panel has a TFT substrate 102, an opposite substrate 104, and a liquid crystal layer 106 sealed between the substrates 102 and 104. The TFT substrate 102 includes a plurality of gate bus lines 112 formed on a glass substrate 110 and a plurality of drain bus lines 114 extending across the gate bus lines 112 with an insulation film 130 interposed between them. Channel protection film type TFTs 120 are formed in the vicinity of intersections between the gate bus lines 112 and the drain bus lines 114. A protective film 131 is formed on the TFT 120. Storage capacitor bus lines 118 are formed so as to extend across pixel regions surrounded by the gate bus lines 112 and the drain bus lines 114 and in parallel with the gate bus lines 112.

Each of the pixel regions is generally divided into three areas, and the region thus includes a reflective area disposed in the middle and two transmissive areas disposed above and below the reflective area in the view in FIG. 7. A reflective plate 150 is formed above the insulation film 130 in the reflective area, the reflecting plate being formed from the same material and in the same layer as the drain bus lines 114. A plurality of openings 118a is formed in a region of the storage capacitor bus line 118 overlapping the reflective plate 150. On both sides of the storage capacitor bus line 118, there are two metal layers 152 which are formed from the same material and in the same layer as the storage capacitor bus line 118 and each of which is electrically isolated from the storage capacitor bus line 118. A plurality of openings 152a is formed in the metal layers 152. A plurality of dielectric layers 153 is provided on the metal layers 152, the dielectric layers being formed from the same material and in the same layer as the channel protection film of the TFT 120. Since the storage capacitor bus line 118 formed with the openings 118a, the metal layers 152 formed with the openings 152a, and the dielectric layer 153 are formed under the reflective plate 150, irregularities in a shape following those elements are formed on the surface of the reflective plate 150.

Transparent pixel electrodes 116 having a predetermined shape are formed in the pixel regions above the protective film 131. The pixel electrodes 116 in the reflective area and the transmissive areas of one pixel are electrically connected to each other. The pixel electrodes 116 are electrically connected to a source electrode of the TFT 120 through a contact hole 125. The pixel electrodes 116 are electrically connected to the reflective plate 150 through an opening 132 providing by etching the protective film 131 on the reflective plate 150.

The opposite substrate 104 includes a common electrode 141 formed on a glass substrate 111. Point-like protrusive structures 142 formed on the common electrode 141 substantially in the middle of the transmissive areas as alignment regulating structures for regulating the alignment of liquid crystal molecules of the liquid crystal layer 106. A columnar spacer 143 for maintaining a cell gap is formed on the common electrode 141 substantially in the middle of the reflective area. The columnar spacer 143 also serves as an alignment regulating structure. A transparent resin layer may be formed between the glass substrate 111 and the common electrode 141 in the reflective area to reduce the cell gap in the reflective area to substantially one-half of the cell gap in the transmissive areas. The liquid crystal display panel shown in FIGS. 7 to 8B can achieve relatively high display quality in both of reflective and trasmissive modes.

However, the liquid crystal display panel shown in FIGS. 7 to 8B has a problem in that variation of a cell thickness (variation attributable to gravity) occurs when the panel is erected such that substrate surfaces are substantially in parallel with the vertical direction and left under the high temperature, the variation being a greater cell thickness in a lower part of the panel in comparison to that in an upper part. It is assumed that variation attributable to gravity occurs because the columnar spacer 143 is formed at all pixels. Specifically, a substrate combining step for combining the TFT substrate 102 and the opposite substrate 104 is performed with a predetermined pressure applied between the substrates 102 and 104. When the columnar spacers 143 are formed at all pixels, no high pressure is applied to each columnar spacer 143. Therefore, substantially no compression occurs at each columnar spacer 143. As a result, when the cell thickness increases as a result of thermal expansion of the volume of the liquid crystal sealed between the substrates 102 and 104, the columnar spacers 143 cannot deform in compliance with the same. When the height of the columnar spacers 143 is smaller than the increased cell thickness, the columnar spacers 143 leave either of the substrates. As a result, when the liquid crystal display panel is erected, the liquid crystal in an upper part of the panel moves down to a lower part of the panel due to gravity, and the cell thickness thus becomes greater in the lower part than in the upper part.

A possible way to simply suppress an irregularity of a cell thickness is to reduce the density in which the columnar spacers 143 are disposed. However, in the configurations shown in FIG. 7 to FIG. 8B, since the columnar spacers 143 also serve as an alignment regulating structure, it is difficult to reduce the density in which the columnar spacer 143 are disposed.

Patent Document 1: JP-A-2000-267121
Patent Document 2: JP-A-2003-241185

SUMMARY OF THE INVENTION

It is an object of the invention to provide a liquid crystal display on which no display irregularity attributable to an irregularity of the cell thickness is visually perceived and which can therefore provide high display quality.

The above-described object is achieved by a liquid crystal display characterized in that it includes first and second substrates provided opposite to each other; a liquid crystal layer sealed between the first and the second substrates; a pixel region formed on the first substrate and including a reflective area having a reflective plate for reflecting light impinging thereon from the side of the second substrate; a thin film transistor formed at each pixel region on the first substrate and having source and drain electrodes formed from the same material as the reflective plate and a gate electrode; a protective film formed on the thin film transistor; a columnar spacer formed in a region where a first electrode layer formed from the same material as the gate electrode, a second electrode layer formed from the same material as the source and drain electrodes, and the protective film are provided one over another, the columnar spacer contacting both of the first and the second substrates to maintain a cell gap; and a protrusive structure formed in the reflective area on either of the first and the second substrates from the same material as the columnar spacer, the protrusive structure regulating the alignment of liquid crystal molecules in the liquid crystal layer.

The invention makes it possible to provide a liquid crystal display on which no display irregularity attributable to an irregularity of the cell thickness is visually perceived and which can therefore achieve high display quality.

BRIEF DESCRIPTION OF THE DRAWINGS

FIGS. 3A and 3B are sectional views showing a configuration of the liquid crystal display in the mode for carrying out the invention;

FIGS. 5A and 5B are sectional views showing the modification of the configuration of the liquid crystal display in the mode for carrying out the invention;

FIGS. 6A and 6B are sectional views showing a configuration of a liquid crystal display according to an embodiment in the mode for carrying out the invention;

FIGS. 8A and 8B are sectional views showing a configuration of the semi-transmissive liquid crystal display.

DESCRIPTION OF THE PREFERRED EMBODIMENT

Figure 1:
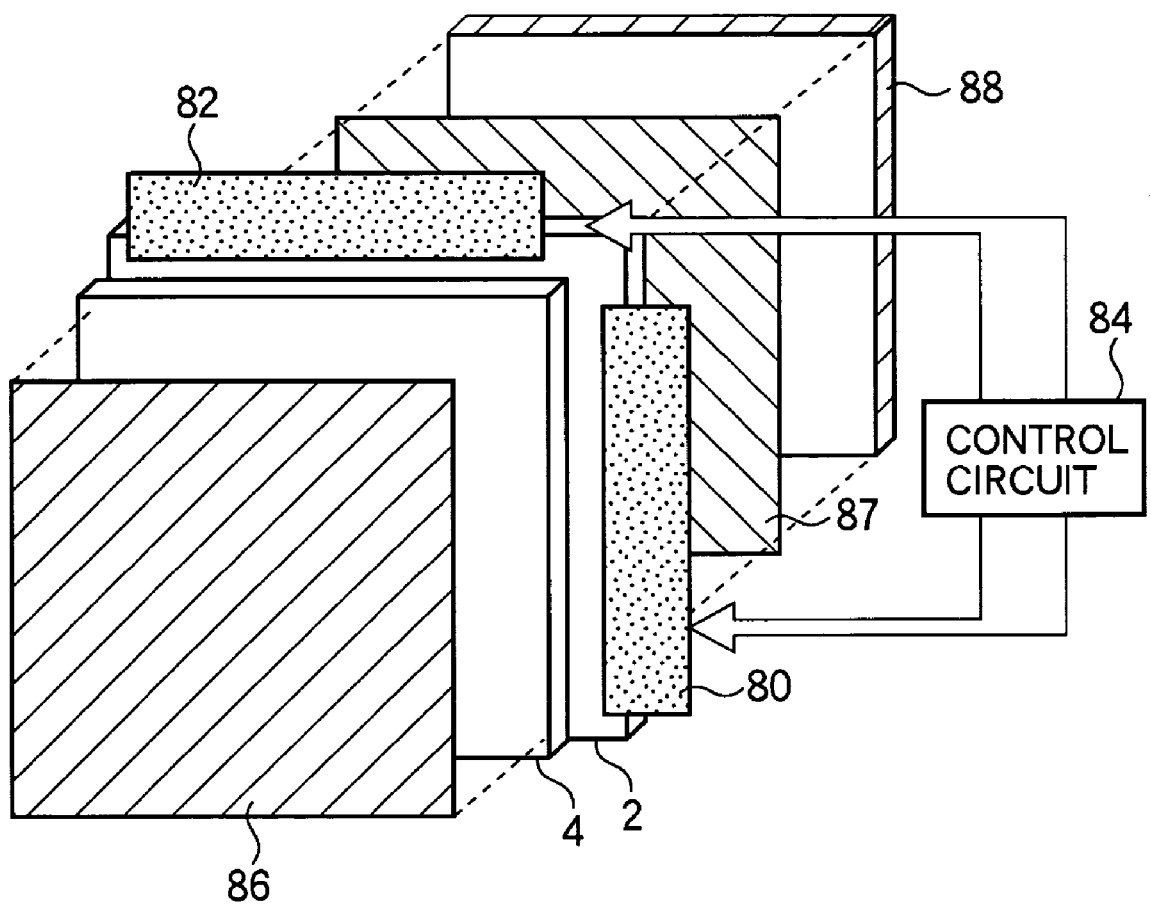
FIG. 1 shows a schematic configuration of a liquid crystal display in a mode for carrying out the invention.

A liquid crystal display according in a mode for carrying out the invention will now be described with reference to FIGS. 1 to 6B. FIG. 1 shows a schematic configuration of the liquid crystal display in the present mode for carrying out the invention. As shown in FIG. 1, the liquid crystal display includes a TFT substrate 2 having gate bus lines and drain bus lines formed across each other with an insulation film interposed between them and a TFT and a pixel electrode formed at each pixel. The liquid crystal display also includes an opposite substrate 4 having color filter (CF) layers and a common electrode formed thereon and a liquid crystal layer 6 (not shown in FIG. 1) provided by sealing, for example, a VA-mode liquid crystal having negative dielectric constant anisotropy between the substrates 2 and 4.

The TFT substrate 2 is connected to a gate bus line driving circuit 80 loaded with a driver IC for driving a plurality of gate bus lines and a drain bus line driving circuit 82 loaded with a driver IC for driving a plurality of drain bus lines. The driving circuits 80 and 82 output scan signals and data signals to predetermined gate bus lines and drain bus lines based on predetermined signals output by a control circuit 84. A polarizer 87 is provided on a surface of the TFT substrate 2 opposite to the surface thereof on which the TFT elements are formed, and a polarizer 86 is provided on a surface of the opposite substrate 4 opposite to the surface thereof on which the common electrode is formed, the polarizer 86 being in a crossed Nicols relationship with the polarizer 87. A backlight unit 88 is provided on a surface of the polarizer 87 opposite to the surface thereof facing the TFT substrate 2.

Figure 2:
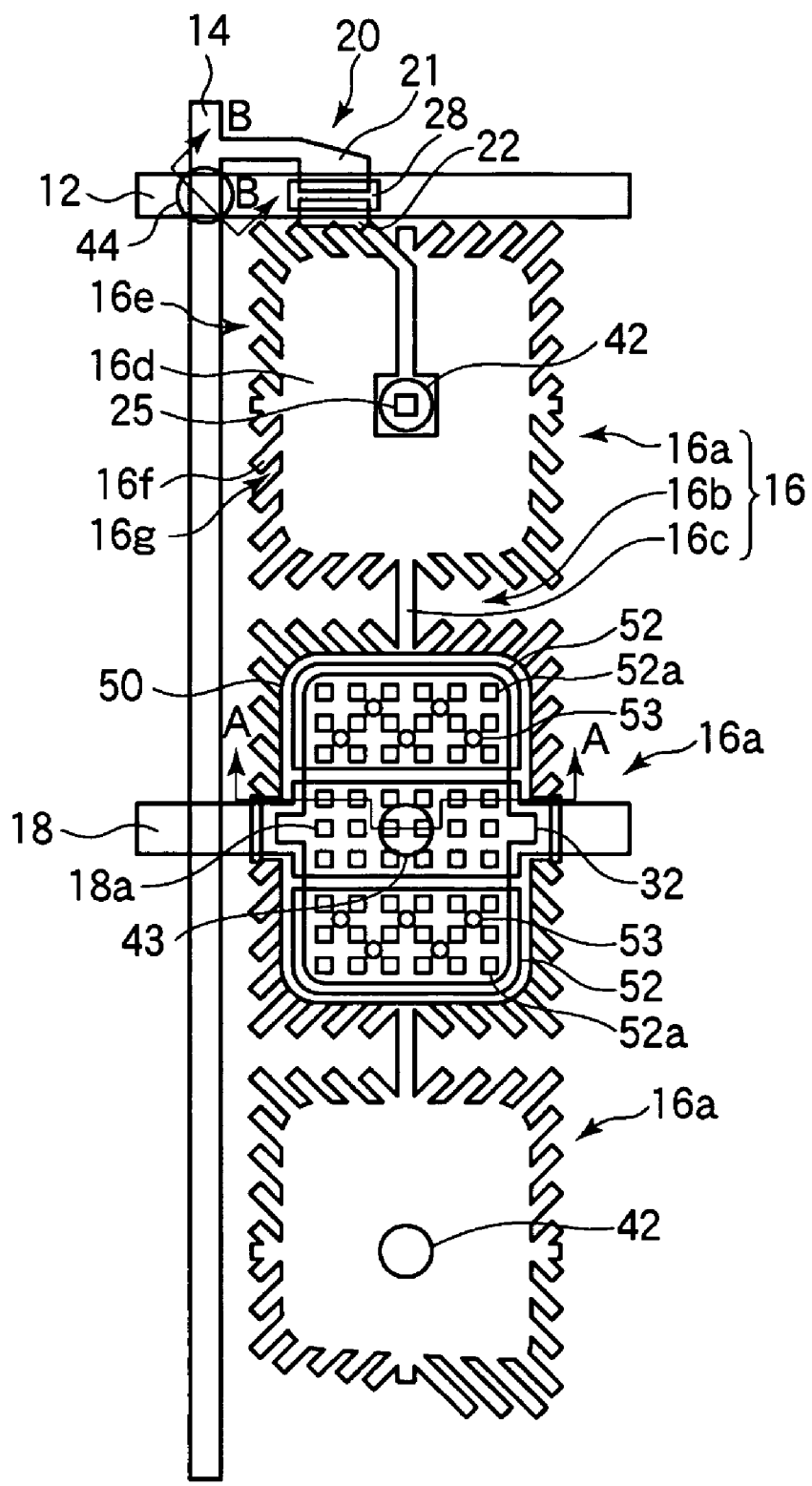
FIG. 2 shows a configuration of one pixel of the liquid crystal display in the mode for carrying out the invention.

FIG. 2 shows a configuration of one pixel of the liquid crystal display of the present mode for carrying out the invention. FIG. 3A is a view of a sectional configuration of the liquid crystal display taken along the line A-A in FIG. 2, and FIG. 3B is a view of a sectional configuration taken along the line B-B in FIG. 2. As shown in FIGS. 2 to 3B, the TFT substrate 2 includes a plurality of gate bus lines 12 formed in parallel with each other on a glass substrate 10 and a plurality of drain bus lines formed in parallel with each other so as to extend across the gate bus lines 12 with an insulation film 30 interposed between them. For example, the drain bus lines 14 have a multi-layer structure including an aluminum (Al) layer 60 and a titanium (Ti) layer (or a chromium (Cr) layer) 61 above the same. Regions surrounded by the gate bus lines 12 and the drain bus lines 14 serve as pixel regions. For example, a channel protection film type TFT 20 is provided in the vicinity of an intersection between a gate bus line 12 and a drain bus line 14. A drain electrode 21 and a source electrode 22 of the TFT 20 are formed from the same material and in the same layer as the drain bus line 14. The drain electrode 21 of the TFT 20 is electrically connected to the drain bus line 14. A gate electrode of the TFT 20 is formed from the same material and in the same layer as the gate bus line 12. In the present mode for carrying out the invention, a region of the gate bus line 12 located directly under a channel protection film 28 serves as the gate electrode of the TFT 20. A protective film 31 constituted by a silicon nitride film (SiN film) is formed on the TFT 20. A storage capacitor bus line 18 extending across the pixel region substantially in the middle of the same in parallel with the gate bus line 12 is formed from the same material and in the same layer as the gate bus line 12.

Each pixel region has a reflective area which reflects light impinging thereon from the side of the opposite substrate 4 and transmissive areas which transmit light impinging thereon from the side of the TFT substrate 2. For example, the reflective area is provided in the vicinity of a central part of the pixel region across which the storage capacitor bus line 18 extends, and the transmissive areas are provided above and under the reflective area in the view of FIG. 2. A reflective plate 50 is formed in the reflective area on the insulation film 30, the plate being formed from the same material and in the same layer as the drain bus line 14. A plurality of openings 18a is formed in a region of the storage capacitor bus line 18 overlapping the reflective plate 50. In order to prevent any increase in the electrical resistance of the storage capacitor bus line 18 and any reduction in the area of an electrode attributable to the openings 18a, the width of the storage capacitor bus line 18 is greater in the same region than in other regions of the bus line. On both sides of the storage capacitor bus line 18, there is provided two metal layers 52 which are formed from the same material and in the same layer as the storage capacitor bus line 18 and each of which is electrically separated from the storage capacitor bus line 18. A plurality of openings 52a is provided in the metal layers 52. A plurality of dielectric layers 53 is formed on the metal layers 52. The dielectric layers 53 are formed from the same material and in the same layer as the channel protection film 28 of the TFT 20. Since the formation of the dielectric layers 53 involves patterning using back exposure, the layers are not provided above the openings 52a but on the metal layers 52. Since the storage capacitor bus line 18 having the openings 18a formed therein, the metal layers 52 having the openings 52a formed therein, and the dielectric layers 53 are formed below the reflective plate 50, they serve as irregularity-forming layers which form irregularities on the reflective plate 50. Irregularities which follow the shape of the irregularity-forming layers are formed on the surface of the reflective plate 50. The reflective plate 50 having irregularities thus formed causes scattered reflection of light which has impinged thereon from the side of the opposite substrate 4. The reflective plate 50, the storage capacitor bus line 18, and the insulation film 30 interposed between them form a storage capacitor portion at each pixel. While the dielectric layers 53 are formed only on the metal layers 52 in the present mode for carrying out the invention, the dielectric layers 53 may be also formed on the storage capacitor bus line 18. In this case, however, since the distance between electrodes of the storage capacitor portion is increased, the electrical capacitance of the storage capacitor portion is decreased.

A pixel electrode 16 constituted by a transparent conductive film such as an ITO is formed in the pixel region on the protective film 31. The pixel electrode 16 includes an electrode unit 16a provided in each of the reflective area and the two transmissive areas, slits 16b formed between adjoining pairs of the electrode units 16a, and connection electrodes 16c electrically connecting the electrode units 16a which are separated by the slits 16b. The electrode units 16a have a solid portion 16d provided in the middle and a comb-like portion 16e provided at the periphery of the solid portion 16d. The comb-like portion 16e includes a plurality of linear electrodes 16f extending from the solid portion 16d and spaces 16g formed between linear electrodes 16f adjoining each other. The linear electrodes 16f extend in four different directions depending on the regions where they are located. The linear electrodes 16f in the top right parts of the electrode units 16a in FIG. 2 extend upward and to the right, and the linear electrodes 16f in the bottom right parts of the electrode units 16a extend downward and to the right. The linear electrodes 16f in the top left parts of the electrode units 16a extend upward and to the left, and the linear electrodes 16f in the bottom left parts of the electrode units 16a extend downward and to the left. When a voltage is applied to the liquid crystal layer 6, liquid crystal molecules are tilted in parallel with the extending directions of the linear electrodes 16f and toward the solid portions 16d. Thus, the alignment of the liquid crystal layer 6 is divided into four directions at each of the electrode units 16a.

The pixel electrode 16 is electrically connected to a source electrode 22 of the TFT 20 through a contact hole 25. The pixel electrode 16 is also electrically connected to the reflective plate 50 through an opening 32 provided by etching the protective film 31 on the reflective plate 50. The Ti layer 61 located above the reflective plate 50 is also etched away along with the protective film 31. As a result, the reflective plate 50 has a reflective surface 50a provided by thus exposing the Al layer 60 which has a light reflectivity higher than that of the Ti layer 61. The solid portions 16d of the pixel electrode 16 are formed to cover the entire reflective surface 50a such that the Al layer 60 and the liquid crystal layer 6 will not contact each other.

The opposite substrate 4 includes a common electrode 41 formed on a glass substrate 11. Point-like protrusive structures 42 formed from a photosensitive resin are provided on the common electrode 41 substantially in the middle of the transmissive areas. A point-like protrusive structure 43 formed from, for example, the same material as the protrusive structures 42 is provided on the common electrode 41 substantially in the middle of the reflective area. The protrusive structures 42 and 43 serve as alignment regulating structures for regulating the alignment of the liquid crystal molecules in the liquid crystal layer 6. For example, the protrusive structures 42 and 43 are formed in a substantially circular shape. Although not shown, a transparent resin layer may be formed between the glass substrate 11 and the common electrode 41 in the reflective area to make the cell gap in the reflective area substantially equal to one-half of the cell gap in the transmissive areas.

Columnar spacers 44 which contact both of the TFT substrate 2 and the opposite substrate 4 to maintain the cell gap are formed in positions on the common electrode 41 associated with intersections between the gate bus lines 12 (first electrode layer) and the drain bus lines 14 (second electrode layer) on the TFT substrate 2. The columnar spacers 44 are formed from the same material as the protrusive structures 43 in the reflective areas and are uniformly provided throughout a display area in a disposition density of one per five (or more) pixels that is lower than the disposition density of the protrusive structures 43. For example, the columnar spacers 44 are formed in a substantially circular shape. The columnar spacers 44 may be formed in positions associated with intersections between the storage capacitor bus lines 18 and the drain bus lines 14.

The height of the protrusive structures 43 in the reflective areas and the height of the columnar spacers 44 are substantially the same. Unlike the regions where the columnar spacers 44 are provided, the protective film 31 and the Ti layer 61 are removed in the reflective areas of the TFT substrate 2 to form electrode units 16a (pixel electrodes 16) in the areas. Let us assume that the combined thickness of the protective film 31 and the Ti layer 61 is 0.33 μm and that the thickness of the pixel electrodes 16 is 0.07 μm. Then, an interval d1 between the protrusive structures 43 and the TFT substrate 2 is about 0.26 (=0.33−0.07) μm. Therefore, the protrusive structures 43 disposed in a disposition density of one per pixel do not contact the TFT substrate 2 and contact only the opposite substrate 4 at an ordinary temperature, and the columnar spacers 44 disposed at a lower disposition density (one per five or more pixels) are always in contact with both of the TFT substrate 2 and the opposite substrate 4 to maintain the cell gap.

In the present mode for carrying out the invention, when a predetermined pressure is applied between the substrates 2 and 4 at a substrate combining step, the columnar spacers 44 are compressed at a relatively high pressure per spacer. Thus, even when the cell thickness is increased by an increase in the volume of the liquid crystal as a result of thermal expansion, the columnar spacers 44 can deform in compliance with the same. Since the columnar spacers 44 therefore leave neither of the substrates, no irregularity attributable to gravity occurs when the liquid crystal display panel is erected upright, and a uniform cell thickness is maintained in the display area. It is therefore possible to provide a liquid crystal display having high display quality on which no display irregularity attributable to an irregularity of the cell thickness will be visually perceived.

When the TFT substrate 2 or opposite substrate 4 is locally subjected to an external pressure such as a press with a finger, the protrusive structures 43 disposed in a higher disposition density (one per pixel) contact both of the substrates 2 and 4, and the cell gap is maintained by the columnar spacers 44 and the protrusive structures 43. In the present mode for carrying out the invention, since the protrusive structures 43 therefore serve as auxiliary spacers, a high resistance to a localized pressure from the outside can be achieved.

A method of manufacturing a liquid crystal display in the present mode for carrying out the invention will now be described with reference to FIGS. 2 to 3B. At a step for fabricating a TFT substrate 2, a metal layer is first formed and patterned throughout a surface of a glass substrate 10 to form gate bus lines 12, storage capacitor bus lines 18, openings 18a, metal layers 52, and openings 52a. Next, an insulation film 30, an amorphous silicon (a-Si) film and a SiN film are continuously formed throughout the surface of the substrate. Subsequently, the SiN film is patterned using back exposure to form channel protection films 28 and dielectric layers 53. Next, an $n^+$ a-Si film, an Al layer, and a Ti layer are formed throughout the surface of the substrate. Subsequently, the Ti layer, the Al layer, the $n^+$ a-Si film, and the a-Si layer are patterned to form drain bus lines 14, drain electrodes 21, source electrodes 22, reflective plates 50, and active semiconductor layers (not shown) of TFTs 20. Next, a SiN film is formed throughout the surface of the substrate to form a protective film 31. Then, the protective film 31 is patterned to from contact holes 25 and openings 32. For example, the patterning is performed using an etchant which dissolves SiN and Ti and does not dissolve Al. As a result, the protective film 31 on the reflective plate 50 is removed along with the Ti layer 61 to form reflective surfaces 50a which are parts of the Al layer 60 exposed through the openings 32. Next, an ITO film is formed and patterned throughout the surface of the substrate to form pixel electrodes 16. The pixel electrodes 16 are electrically connected to the source electrodes 22 through the contact holes 25 and are electrically connected to the reflective plates 50 through the openings 32. The pixel electrodes 16 are formed to cover the reflective surfaces 50a entirely. A TFT substrate 2 is fabricated through the above-described step.

At a step for fabricating an opposite substrate 4, CF layers and a transparent resin layer are first formed on a glass substrate 11, and a common electrode 41 constituted by an ITO is formed throughout a surface of the substrate. Next, a photosensitive resin is applied to the common electrode 41 and patterned to form columnar spacers 44 and protrusive structures 43. The columnar spacers 44 are disposed in regions associated with intersections of the gate bus lines 12 and the drain bus lines 14 on the TFT substrate 2 in a disposition density of one per five or more pixels. For example, one protrusive structure 43 is disposed in a reflective area of every pixel. At this step, protrusive structures 42 in transmissive areas may be formed at the same time. An opposite substrate 4 is fabricated through the above-described step.

Next, vertical alignment films are formed on the TFT substrate 2 and the opposite substrate 4, and the TFT substrate 2 and the opposite substrate 4 are combined by applying a predetermined pressure to them. Subsequently, a gap between the substrates 2 and 4 is filled with a liquid crystal having negative dielectric constant anisotropy and is sealed to fabricate a liquid crystal display panel. For example, the liquid crystal has refractive index anisotropy Δn of 0.08. Thereafter, a liquid crystal display in the present mode for carrying out the invention is completed through a predetermined module fabrication step.

In the present mode for carrying out the invention, the reflective plates 50 have a reflective surface 50a that is an exposed part of the Al layer 60 constituted by a high reflectivity metal which is formed from the same material as the drain bus lines 14, the drain electrodes 21, and the source electrodes 22 at the same time when those elements are formed. The reflective surfaces 50a are formed at the same time when the protective film 31 is patterned to form the contact holes 25 and the openings 32 are formed. It is therefore possible to provide reflective plates 50 having high light reflectivity without any increase in manufacturing steps.

In the present mode for carrying out the invention, the pixel electrodes 16 constituted by an ITO are formed to cover the reflective surfaces 50a, and the top surfaces of electrodes formed on each of the substrates 2 and 4 are all constituted by an ITO. Therefore, the substrates 2 and 4 are electrically symmetrical, which reduces the possibility of any reduction in display quality attributable to sticking.

Figure 4:
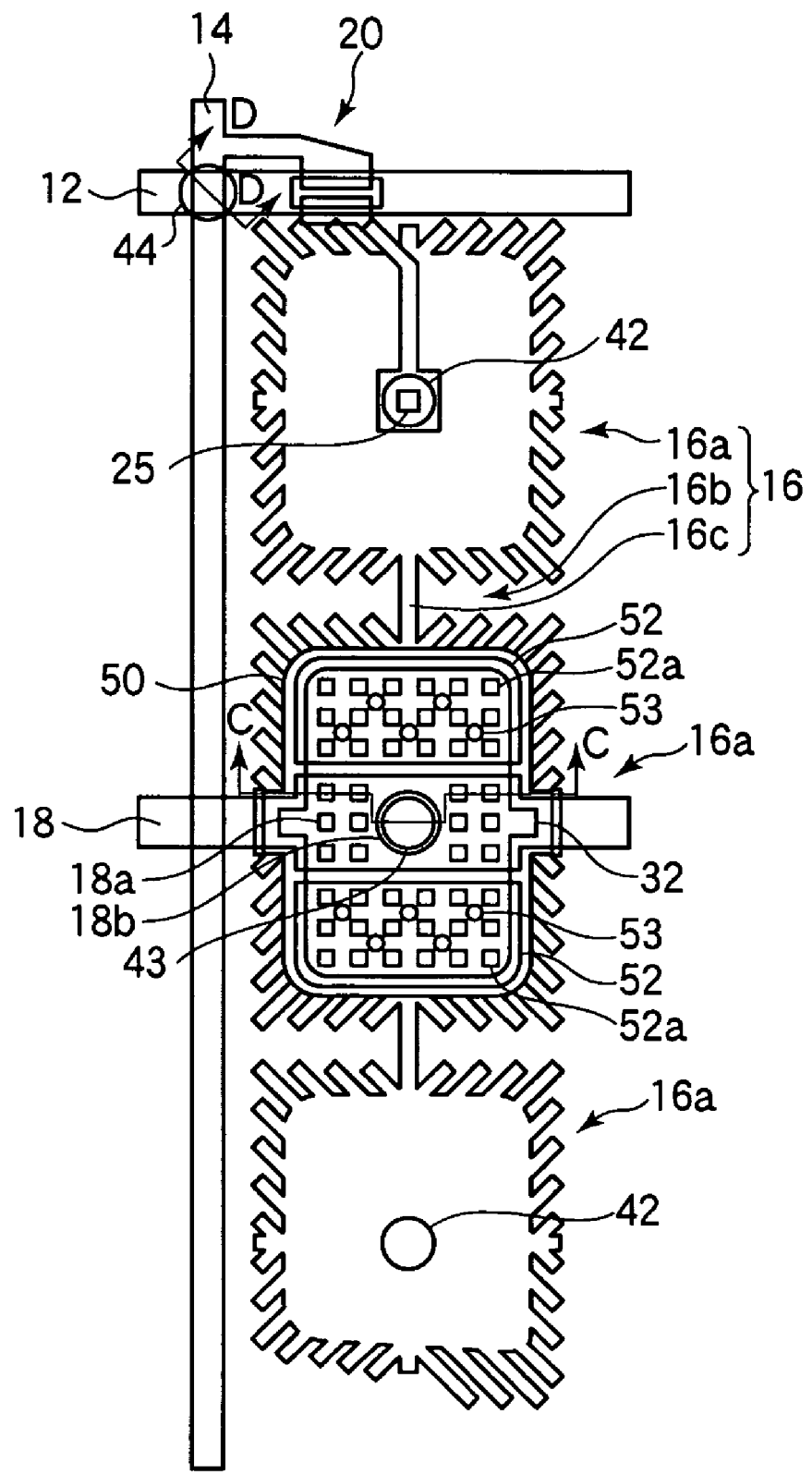
FIG. 4 shows a modification of the configuration of the liquid crystal display in the mode for carrying out the invention.
Figure 7:
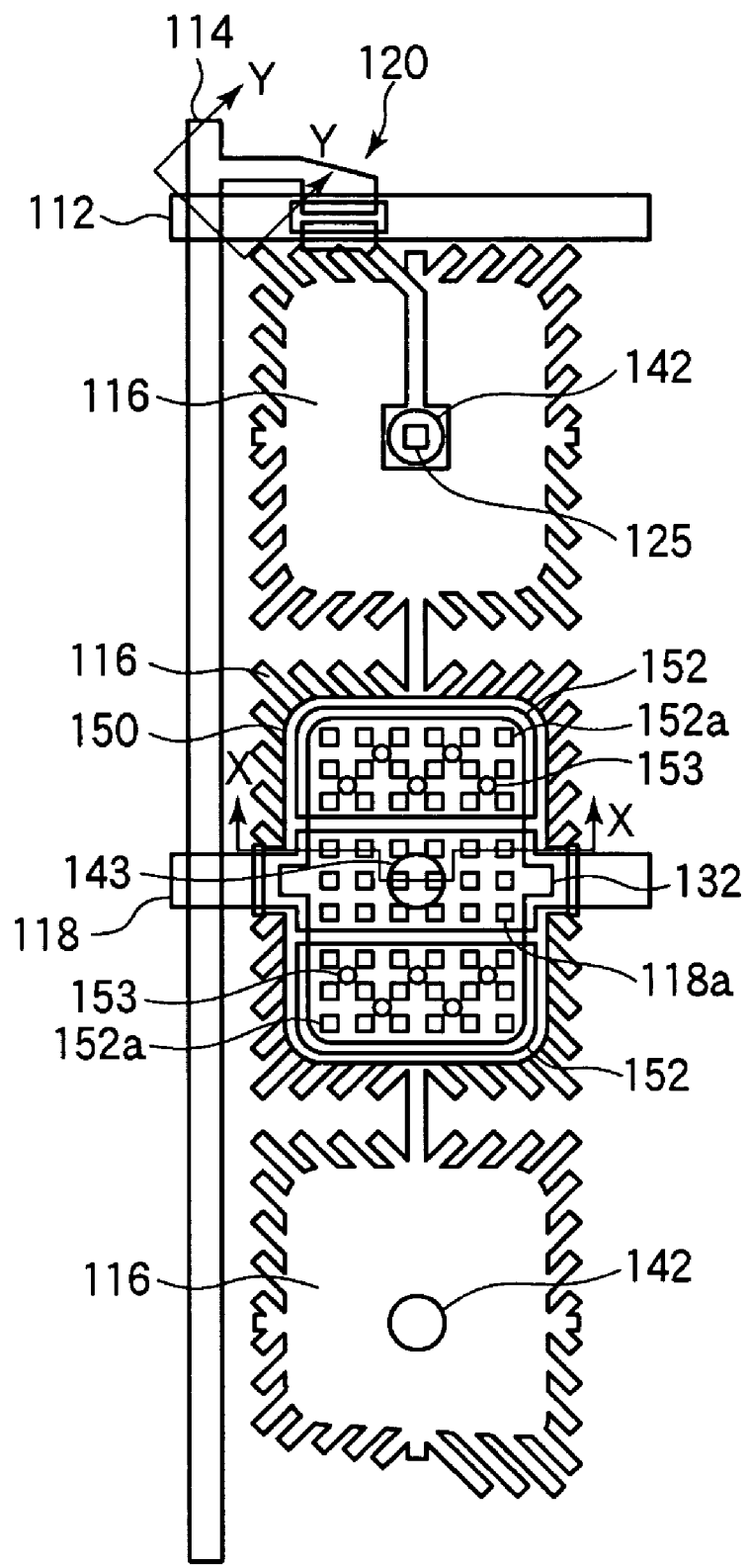
FIG. 7 shows a configuration of one pixel of a semi-transmissive liquid crystal display.

FIG. 4 shows a modification of the configuration of the liquid crystal display in the present mode for carrying out the invention. FIG. 5A is a view of a sectional configuration of the liquid crystal display taken along the line C-C in FIG. 4. FIG. 5B is a view of a sectional configuration of the liquid crystal display taken along the line D-D in FIG. 4. In the present modification, as shown in FIGS. 4 to 5B, a circular opening 18b is formed in and around a region of a storage capacitor bus line 18 opposite to a protrusive structure 43. That is, an irregularity forming layer is formed in a reflective area excluding the region where the protrusive structure 43 is formed. As a result, when the storage capacitor bus line 18 has a thickness of 0.22 μm, the protrusive structure 43 is spaced from the TFT substrate 2 at an interval d2 of about 0.48 (=0.33+0.22−0.07) μm which is greater than the interval d1 shown in FIGS. 3A and 3B. In the present modification, since the substantial difference between the heights of the columnar spacers 44 and protrusive structures 43 can be made greater than that in the configuration shown in FIGS. 1 to 3B, the protrusive structures 43 will not contact the TFT substrate 2 when the substrates 2 and 4 are combined. Therefore, the same advantage as provided by the configuration shown in FIGS. 1 to 3B can be achieved with higher reliability.

The liquid crystal display in the present mode for carrying out the invention will now be described with reference to a specific embodiment of the same. FIGS. 6A and 6B show a sectional configuration of a semi-transmissive liquid crystal display according to an embodiment in the present mode for carrying out the invention. FIG. 6A shows a sectional configuration of the neighborhood of a protrusive structure 43 in a reflective area, and FIG. 6B shows a sectional configuration of the neighborhood of a columnar spacer 44. As shown in FIGS. 6A and 6B, red (R), green (G), and blue (B) CF layers 45 are formed on a glass substrate. 11 that constitutes an opposite substrate 4. A CF layer 45 in any of the colors R, G, and B is formed in each pixel region. The CF layer 45 is patterned so as to be eliminated in a part of the reflective area. Light passes through the CF layer 45 only once during display in a transmissive mode, whereas light passes through the CF layer 45 twice during display in a reflective mode. Therefore, when the CF layer 45 is removed in a part of a reflective area as in the present embodiment, the absorption of light by the CF layer 45 is suppressed, which makes it possible to improve reflectivity and to achieve higher luminance during display in the reflective mode.

A transparent resin layer 46 is formed in the reflective region on the CF layer 45. The thickness of the transparent resin layer 46 is about 2 μm which is, for example, substantially one-half of the cell gap in a transmissive area. Therefore, the reflective area has a cell gap that is substantially one-half of the cell gap in a transmissive area. In a region where a columnar spacer 44 is formed, a transparent resin layer 47 is provided which is formed from the same material and in the same layer as the transparent resin layer 46. A common electrode 41 is formed throughout surfaces of the transparent resin layers 46 and 47 and the CF layer 45. Columnar spacers 44 are disposed in positions on the common electrode 41 associated with intersections between gate bus lines 12 and drain bus lines 14 on a TFT substrate 2 in a disposition density of, for example, one per twelve pixels. For example, the height of the columnar spacers 44 is about 2 μm.

The protrusive structure 43 for regulating the alignment of liquid crystal molecules in a liquid crystal layer 6 are disposed on the common electrode 41 substantially in the middle of the reflective areas, the structures being formed from the same material and in the same layer as the columnar spacers 44. The height of the protrusive structures 43 and the height of the columnar spacers 44 are substantially the same. Unlike the region where the columnar spacer 44 are provided, openings 32 and 18b are formed in the regions of the TFT substrate 2 where the protrusive structures 43 are disposed to remove a protective film 31, a Ti layer 61, and storage capacitor bus lines 18 (gate bus lines 12) in those regions and to form electrode units 16a (pixel electrodes 16) there. Therefore, the protrusive structures 43 are spaced from the TFT substrate 2 at an interval d2 of about 0.48 μm which is the same as that in the configuration shown in FIGS. 5A and 5B, and the protrusive structures 43 are not in contact with the TFT substrate 2 at an ordinary temperature. A reflective area has a cell thickness in the range from about 2.3 to 2.5 μm which is slightly greater than the height of the protrusive structures 43 and the columnar spacers 44 (2 μm). Although not shown, protrusive structures 42 are provided on the common electrode 41 substantially in the middle of transmissive areas, the structures being formed from the same material and in the same layer as, for example, the columnar spacers 44 and the protrusive structures 43. Since the transparent resin layers 46 and 47 are not formed in the transmissive areas, the protrusive structures 42 do not contact the TFT substrate 2 and, the protrusive structures 42 and the TFT substrate 2 are at an interval of about 2 μm from each other.

The invention is not limited to the above-described mode for carrying out the same and may be modified in various ways.

For example, although a liquid crystal display having channel protection film type TFT has been described by way of example in the above mode for carrying out the invention, the invention is not limited to the same and may be applied to a liquid crystal display having channel etch type TFTs. In the case of a liquid crystal display having channel etch type TFTs, a semiconductor layer formed from the same material as an active semiconductor layer may be provided as an irregularity-forming layer instead of the dielectric layer 53 formed from the same material as the channel protection film 28.

Although a semi-transmissive liquid crystal display has been described by way of example in the above mode for carrying out the invention, the invention is not limited to the same and may be applied to a reflective liquid crystal display in which a pixel region is constituted only by a reflective area.

Further, although a VA mode liquid crystal display has been described by way of example in the above mode for carrying out the invention, the invention is not limited to the same and may be applied to liquid crystal displays having other modes of operation such as the TN mode and IPS mode.

What is claimed is:

1. A liquid crystal display comprising:
   first and second substrates provided opposite to each other;
   a liquid crystal layer sealed between the first and the second substrates;
   a pixel region formed on the first substrate and including a reflective area having a reflective plate for reflecting light impinging thereon from the side of the second substrate;
   a thin film transistor formed at each pixel region on the first substrate and having source and drain electrodes formed from the same material as the reflective plate and a gate electrode;
   a protective film formed on the thin film transistor;
   a columnar spacer formed in a region, outside the reflective area, where a first electrode layer formed from the same material as the gate electrode, a second electrode layer formed from the same material as the source and drain electrodes, and the protective film are provided one over another, the columnar spacer contacting both of the first and the second substrates to maintain a cell gap; and
   a protrusive structure formed in the reflective area on either of the first and the second substrates from the same material as the columnar spacer, the protrusive structure regulating the alignment of liquid crystal molecules in the liquid crystal layer.

2. A liquid crystal display according to claim 1, wherein the protective film is removed in the reflective area.

3. A liquid crystal display according to claim 1, comprising a first bus line formed from the same material as the gate electrode and a second bus line formed from the same material as the source and drain electrodes and extending across the first bus line with an insulation film interposed between them, wherein the columnar spacer is formed at an intersection between the first and second bus lines.

4. A liquid crystal display according to claim 1, wherein the protrusive structure contacts only either of the first and second substrates at an ordinary temperature.

5. A liquid crystal display according to claim 4, wherein the protrusive structure contacts both of the first and second substrates when the first or second substrate is pressed from the outside.

6. A liquid crystal display according to claim 1, wherein the reflective plate has a reflective surface formed from a metal having high reflectivity.

7. A liquid crystal display according to claim 1, comprising an irregularity-forming layer formed in the reflective area under the reflective plate to form irregularities on the reflective plate.

8. A liquid crystal display according to claim 7, wherein at least a part of the irregularity-forming layer is formed from the same material as the gate electrode.

9. A liquid crystal display according to claim 7, wherein at least a part of the irregularity-forming layer is formed from the same material as a channel protection film of the thin film transistor.

10. A liquid crystal display according to claim 7, wherein the irregularity-forming layer is formed in the reflective area excluding the region where the protrusive structure is formed.

11. A liquid crystal display according to claim 1, wherein the pixel region further includes a transmissive area which transmits light impinging thereon from the side of the first substrate.

12. A liquid crystal display according to claim 11, comprising a transparent resin layer formed in the reflective area and the region where the columnar spacer is formed.

13. A liquid crystal display according to claim 12, wherein the transparent resin layer has a thickness that is substantially one-half of the cell gap in the transmissive area.

14. A liquid crystal display according to claim 1, wherein the columnar spacers are disposed in a disposition density lower than that of the protrusive structures.

15. The liquid crystal display of claim 1, wherein the columnar spacer is provided at a region where no pixel electrode is present.

* * * * *